(12) United States Patent
Biton

(10) Patent No.: US 12,123,101 B2
(45) Date of Patent: Oct. 22, 2024

(54) METHOD AND APPARATUS FOR CONTINUOUS ELECTROCHEMICAL PRODUCTION OF THREE-DIMENSIONAL STRUCTURES

(71) Applicant: ADDIONICS IL LTD, Tel-Aviv Yaffo (IL)

(72) Inventor: Moshiel Biton, Tel Aviv-Jaffa (IL)

(73) Assignee: ADDIONICS IL LTD, Tel-Aviv Yaffo (IL)

( * ) Notice: Subject to any disclaimer, the term of this patent is extended or adjusted under 35 U.S.C. 154(b) by 1103 days.

(21) Appl. No.: 16/963,499

(22) PCT Filed: Jan. 24, 2019

(86) PCT No.: PCT/IL2019/050103
§ 371 (c)(1),
(2) Date: Jul. 20, 2020

(87) PCT Pub. No.: WO2019/150362
PCT Pub. Date: Aug. 8, 2019

(65) Prior Publication Data
US 2021/0047744 A1    Feb. 18, 2021

(30) Foreign Application Priority Data
Jan. 30, 2018   (IL) .......................................... 257255

(51) Int. Cl.
*C25D 1/00*       (2006.01)
*B33Y 10/00*    (2015.01)
(Continued)

(52) U.S. Cl.
CPC .............. *C25D 1/003* (2013.01); *B33Y 10/00* (2014.12); *B33Y 30/00* (2014.12); *B33Y 50/02* (2014.12); *B33Y 70/00* (2014.12); *C25D 21/12* (2013.01)

(58) Field of Classification Search
None
See application file for complete search history.

(56) References Cited

U.S. PATENT DOCUMENTS 7,229,544 B2    6/2007    Cohen
8,216,931 B2    7/2012    Zhang
(Continued)

FOREIGN PATENT DOCUMENTS

CN         104178782 B    12/2016
WO     WO 2017/009368 A1    1/2017

OTHER PUBLICATIONS

Notification of Office Action and Search Report Dated Feb. 25, 2023 From the State Intellectual Property Office of the People's Republic of China Re. Application No. 201980010937.8 and Its Translation Into English. (22 Pages).
(Continued)

*Primary Examiner* — Stefanie S Wittenberg
(74) *Attorney, Agent, or Firm* — The Roy Gross Law Firm, LLC; Roy Gross

(57) ABSTRACT

The invention provides a device and a method for manufacturing 3D metal structures by a sequence of electroplating steps, each step adding a cross-section layer of the 3D structure via anodes, selected from a planar 2D anode grid array and forming a pattern template, creating a deposition image on a cathode plate.

18 Claims, 5 Drawing Sheets

(51) Int. Cl.
    *B33Y 30/00*      (2015.01)
    *B33Y 50/02*      (2015.01)
    *B33Y 70/00*      (2020.01)
    *C25D 21/12*      (2006.01)

(56) References Cited

U.S. PATENT DOCUMENTS

| | | | |
|---|---|---|---|
| 8,575,025 | B2 | 11/2013 | Fitzpatrick et al. |
| 8,939,774 | B2 | 1/2015 | Scholvin et al. |
| 9,244,101 | B2 | 1/2016 | Cohen et al. |
| 9,777,385 | B2 | 10/2017 | Wirth et al. |
| 2004/0168925 | A1* | 9/2004 | Landau .......... C25D 21/12 205/164 |
| 2006/0163078 | A1* | 7/2006 | Peter .......... C25D 5/10 205/170 |
| 2007/0068819 | A1* | 3/2007 | Singh .......... H01L 21/2885 204/260 |
| 2007/0089993 | A1 | 4/2007 | Schwartz et al. |
| 2015/0251351 | A1* | 9/2015 | Feygin .......... B29C 64/141 156/267 |
| 2017/0145584 | A1 | 5/2017 | Wirth et al. |
| 2018/0020048 | A1 | 1/2018 | Seol et al. |

OTHER PUBLICATIONS

PCT International Search Report and Written Opinion, PCT Application No. PCT/IL2019/050103, Apr. 18, 2019, 12 pages.
PCT International Preliminary Report on Patentability, PCT Application No. PCT/IL2019/050103, Feb. 12, 2020, 15 pages.
Extended European Search Report, European Patent Office Application No. EP19747786.2, Sep. 23, 10 pages.
Notification of Office Action Dated Nov. 30, 2023 From the State Intellectual Property Office of the People's Republic of China Re. Application No. 201980010937.8. (7 Pages).
Translation Dated Dec. 21, 2023 of Notification of Office Action Dated Nov. 30, 2023 From the State Intellectual Property Office of the People's Republic of China Re. Application No. 201980010937.8. (13 Pages).
Notification of Office Action Dated Mar. 27, 2024 From the State Intellectual Property Office of the People's Republic of China Re. Application No. 201980010937.8. (3 Pages).
Translation Dated Apr. 11, 2024 of Notification of Office Action Dated Mar. 27, 2024 From the State Intellectual Property Office of the People's Republic of China Re. Application No. 201980010937.8. (5 Pages).

* cited by examiner

METHOD AND APPARATUS FOR CONTINUOUS ELECTROCHEMICAL PRODUCTION OF THREE-DIMENSIONAL STRUCTURES

FIELD OF THE INVENTION

The present invention relates to a device and method for manufacturing 3D metal structures by a sequence of electroplating steps.

BACKGROUND OF THE INVENTION

Electrodeposition is a common method for growing metal structures on conductive substrates. This growth starts when a negative potential or current is applied between the substrate and a counter electrode. Electroplating is a commonly used method in fabricating electrical micro-connectors. By combining photoresist patterning, electrodeposition, and photoresist removal with repetitive steps, it is possible to fabricate three-dimensional (3D) metal structures with a resolution of few or more microns, wherein the term "3D structures" relates to structures which are not flat (2D). Moreover, by employing this approach it is possible to electrodeposit various metals and alloys on top of each other. By reversing the current or potential, it is possible to electro-dissolve some of the metal components, providing additional routes for creating more complex 3D metal structures. Examples of such techniques can be found in U.S. Pat. Nos. 7,229,544, 8,216,931, 8,575,025, 8,939,774, 9,244,101, and 9,777,385. The known methods and devices are useful for microfabrication industry, but they are difficult to scale up for substrates exceeding the size of silicon wafers, and cannot be employed for practical and cost-effective manufacture of 3D metal structures e.g., such as comprising for example meshes and foams. It is therefore an object of this invention to provide a time- and cost-effective method for creating 3D metal structures of various predetermined sizes by using electrodeposition.

It is another object of this invention to provide a cost-effective, up-scalable method for creating 3D metal structures of a predetermined size of 10 micrometer of more.

It is a further object of this invention to provide 3D metal structures of a micron or submicron size by electrochemical deposition.

It is also an object of this invention to provide a process for producing 3D metal structures of a desired shape and size.

Other objects and advantages of present invention will appear as the description proceeds.

SUMMARY OF THE INVENTION

This invention provides a device for manufacturing 3D metal structures by electrochemical deposition (ECD), comprising i) a cathode comprising a planar surface; ii) an electrolyte in contact with said planar surface, the electrolyte comprising ions of said metal; iii) an array of separate anodes, in contact with said electrolyte, arranged on a planar non-conductive plate (NCP) in a 2D grid, the plane of said plate essentially being parallel and adjacent to said cathode planar surface, the anodes configured to deposit said metal onto said cathode planar surface in deposition areas opposite to them when an electric current flows through them; iv) a controlling system configured to individually regulate the potential between said cathode and each anode of said array, further comprising a microprocessor for collecting data, and for storing data and predetermined parameters; and v) electrically conductive connectors connecting each anode with said controlling system, the connectors being electrically insulated from said electrolyte; wherein said predetermined parameters comprise at least one combination of anodes selected from said array to represent an anode pattern template in said 2D grid, which template provides a deposition pattern on said cathode surface during a discrete time period, when an electric current flows only through said selected anodes, said deposition pattern being essentially a cross-section of said 3D metal structure. In fact, the deposition pattern is an image of said template wherein the anode size and their number define the image resolution. Said NCP may comprise a material selected from the group consisting of polymer, glass, ceramic, and composites thereof. The device advantageously comprises an altering means for changing the deposition pattern in two consecutive discrete time periods. Said altering means is selected from the group consisting of the means for laterally changing the position of said cathode surface and said NCP, the means for changing said combination of anodes selected from the array, and combinations thereof. Said means for laterally changing the position of said cathode surface and said NCP preferably comprise a micro-controlled engine. Said means for changing said combination of anodes usually comprise a software stored in said microprocessor or in a memory. The metal depositions during said consecutive discrete time periods actually correspond to thin layers of said 3D metal structure. In a preferred embodiment of the device according to the invention, said predetermined parameters comprise a sequence of deposition patterns stored in volatile or non-volatile memory to be applied in a sequence of consecutive time periods, resulting in a sequence of thin layers building said 3D metal structure. Said controlling system may comprise a computer-aided design software (CAD). Said altering means is usually configured to consecutively switch on a predetermined sequence of anode combinations. In one embodiment of the invention, said steps of switching on said predetermined anode combinations may be combined with mutual lateral movements of the cathode surface and the NCP; such lateral movements enable metal depositions in the cathode areas not affected by the anode array in cases when the deposition areas corresponding to two neighboring anodes do not overlap. The anodes may have a cross-section shaped as circle, rectangle, triangle, annulus, narrow bands, and parts thereof or combinations thereof. In some embodiments of the invention, the deposition areas corresponding to two neighboring anodes do not overlap. In some embodiments of the invention, the deposition areas corresponding to at least some neighboring anodes overlap. In one embodiment, the deposition areas corresponding to all anodes in the array essentially fill said cathode planar surface. In one embodiment, said grid is a rectangular grid, said anodes have a square cross-section, and the surface of the anode array covers at least 20% of the NCP plane. The device of the invention preferably comprises a perpendicular shifting means for adjusting the distance between said cathode surface and said NCP, the means comprising a micro-controlled engine or motor. During the electroplating process, the distance of the electrodes is preferably regulated in accordance with the growing height (thickness) of the 3D structure and decreasing concentration of the metal ions in the electrolyte. In one embodiment, the device comprises a sensor indicating the distance of the cathode surface and the NCP. In a preferred device according to the invention, the anodes array is embedded and sunk in said NCP, so that the NCP isolates the anodes from each other by non-conductive barriers and forms channels through which said metal ions move from said anodes to said areas on the cathode planar surface on which said metal is deposited. Said anodes may have a size from nanometers to centimeters or more. The height of said barriers is preferably greater than said anode size, sometimes 1.5 times or 2-10 times greater or more. Said barriers can also preclude short circuiting when adjusting the distance between said cathode surface and said NCP. Said controlling system may reverse the potential between the electrodes to dissolve a part of the metal deposited in the cathode surface. A part of the anodes in the device of the invention may be configured to facilitate the deposition of metals along the direction perpendicular to said cathode planar surface. In one embodiment of the invention, the device comprises electrodes for measuring electrolyte conductivity in the ambience of the working electrodes. In some embodiments, the electrodes employed for the electrodeposition may be utilized for the conductivity tests, but alternating current is used; in some embodiments, a four-probe method may be employed, including four additional electrodes/pins in the solution, wherein two pins are used for measuring current and the other two for measuring voltage, thus enabling to assess the resistance of the electrolyte.

The device of the invention for manufacturing a plurality of 3D metal structures, in one aspect, comprises a plurality of cathode surfaces, each surface serving for manufacturing one structure. Such a device preferably comprises a fixing head which holds said cathode surface in the desired position adjacent to the anode array sheet during a stage of electrochemical deposition. In one preferred embodiment, said plurality of surfaces is represented by a long ("infinite") continuous sheet which moves through the head along the anode array, in discreet stages—always stopping for the deposition operation to be effected on a certain part of the continuous sheet, wherein said head holds the desired part of the sheet during one stage, enables the translation of the sheet by desired distance after the stage, and repeatedly holds the sheet during the consecutive stage. The device may comprise a feeding roller which unwinds the sheet and feeds it to the position adjacent to the anode for each stage, and further a receiving roller which winds the sheet in after each stage. In other embodiment, said plurality of surfaces may be realized by a plurality of stacked sheet pieces in a holder, being supplied to said head for each stage.

The invention provides a method for manufacturing 3D metal structures by electrochemical deposition (ECD), comprising i) providing a cathode with a planar surface on which said 3D structure is to be built, an array of separate anodes arranged on a planar non-conductive plate (NCP) in a 2D grid, the plane of said plate essentially being parallel and adjacent to said cathode planar surface, and an electrolyte filling the space between the electrodes and comprising ions of said metal to be deposited; and connecting each anode with a controlling system which individually regulates the potential between each anode and said cathode, and which comprises a microprocessor for storing software and data; ii) supplying to said microprocessor data defining said 3D structure to be manufactured, and creating by a software in said microprocessor a plurality of 2D cross-sections essentially composing said 3D structure; and iii) selecting an anode combination for each 2D cross-section to create a deposition pattern template in said 2D grid, which after switching the selected anodes on will deposit said metal in a deposition pattern essentially forming an image of said 2D cross-section; and activating the selected anodes for a time period sufficient to form a layer of a predetermined thickness, thereby creating one layer after another, eventually forming said 3D structure. Said step iii comprises changing the deposition pattern in consecutive discrete time periods by laterally changing the position of said cathode surface and said NCP while using a micro-controlled engine and/or changing said combination of selected anodes. The invention also relates to a continuous process for manufacturing a plurality of 3D metal structures, comprising providing a plurality of cathode surfaces, each surface serving for manufacturing one structure in one stage, the cathode surface being held adjacent to the anode array by a fixing head during one stage of electrochemical deposition, said plurality of surfaces being realized by a long continuous sheet wound on a coil, or by a stack of separate sheets in a supply holder. The process in one embodiment comprises moving said continuous sheet in discreet stages along the anode array, wherein said head and/or supplying and receiving coils repeatedly move the sheet by the desired distance after finishing each stage; alternatively the supply holder delivers the sheet pieces.

BRIEF DESCRIPTION OF THE DRAWINGS

The above and other characteristics and advantages of the invention will be more readily apparent through the following examples, and with reference to the appended drawings, wherein.

DETAILED DESCRIPTION OF THE INVENTION

It has now been found that the electrochemical deposition (ECD) can be employed in a practical, flexible, and cost-effective process for manufacturing a 3D metal structure with good resolution, when the structure is made on a planar cathode adjacent to an anode planar grid sunk in a plastic plate, while gradually switching a plurality of anode combinations, each representing in said grid a 2D pattern template which is transformed to corresponding deposit image corresponding to a cross-section layer of said 3D structure.

Figure 1:
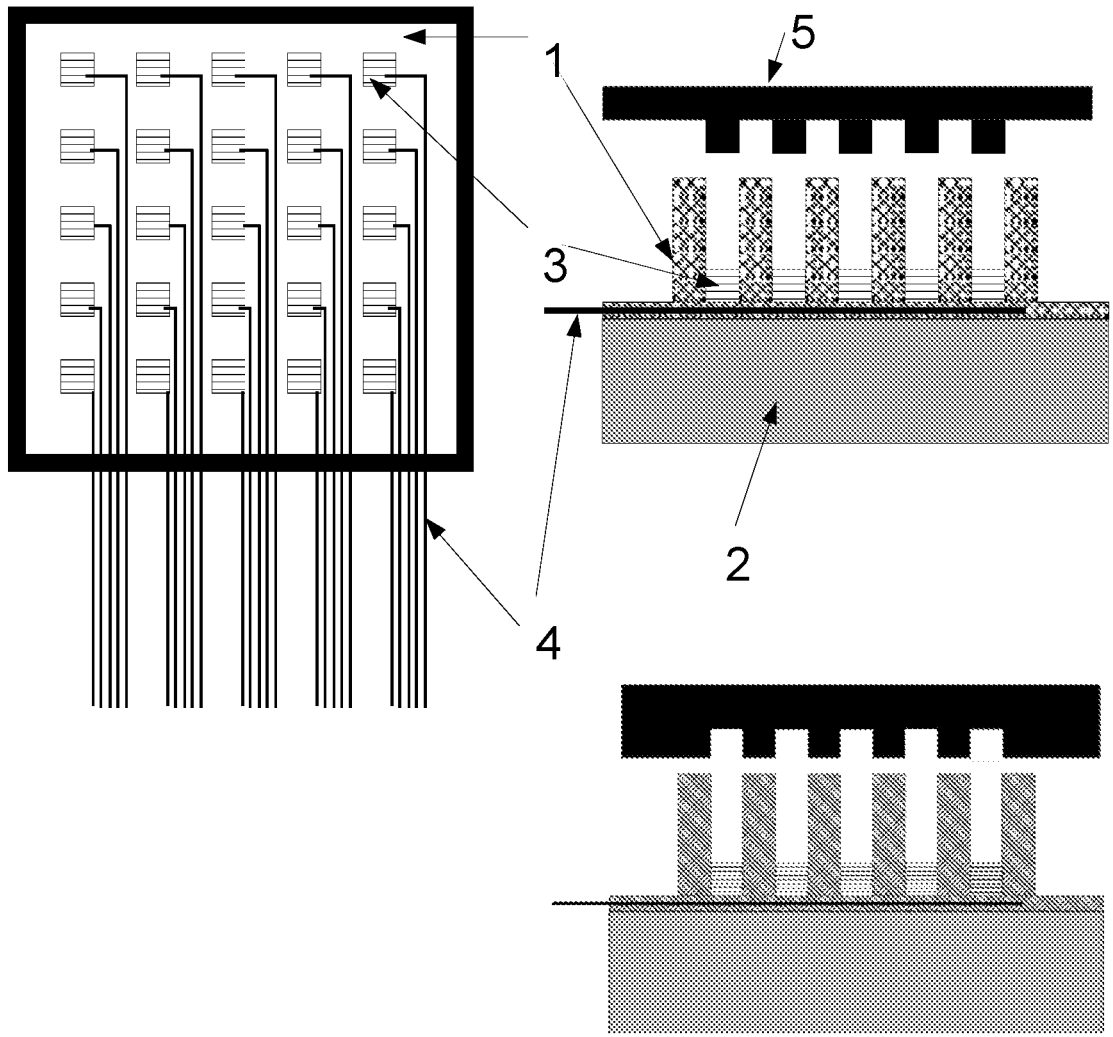
FIG. 1. is a scheme of electroplating apparatus according to one embodiment of the invention.

The invention relates to a method and to an apparatus for continuously creating 3D structures of metals and metal alloys from aqueous and non-aqueous electrolytes by applying a current or potential between two conductive substrates or electrodes. An electrode arrangement in one embodiment of the device according to the invention is shown in FIG. 1. The electrode on which the metal is deposited is called a substrate working electrode or SWE (5), whereas the opposite electrode is realized by an array of counter electrodes or CEs (3) fabricated on a non-conductive plate or NCP (2) than can be rigid or flexible. Said SWE may comprise Cu, Al, Ni, and other metals or alloys for electrodissolution, and for example Cu or Ni for electrodeposition; SWE may comprise other conductive materials, such as carbon sheet, conductive plastic sheet, conductive ceramic sheet, etc.; SWE may have various shapes, for example rectangular for continuous deposition from the rolls. Preferably, NCP is made of a polymer, such as polychlorinated biphenyl, or it may comprise rubber, glass, ceramics, or other non-conductive material. Each mini-electrode CE (3) is connected to the controlling system that can switch on or off the current flowing through it independently of other CEs.

The CEs (3) are embedded in a non-conductive material or NCM (1) that electrically isolates each electrode. Both CEs and SWE are inside the container with electrolyte. CEs and NCM are in contact with the electrolyte, while the CE connectors (4) are not exposed to the electrolyte and are protected by a non-conductive material, preferably the same as NCM; the CEs are connected to a controlling unit located outside the container. The CEs can be of any shape, for example having a cross-section shaped as circle, rectangle, triangle, ring, arc, or other. The CE and the NCM barriers separating them can have a size that ranges from micrometers to millimeters, or to centimeters, or to tens of centimeters. In one aspect, the CE is made of a metal or any conductive material that is stable in the electrolyte and does not corrode under applied current and potential. Preferably, the CE comprises a material selected from glassy carbon, titanium, gold, platinum or other noble metal (Ir, Ru etc.) or their stable alloys with other noble and non-noble metals (Co, Ni, Fe etc.), alloys of transition metals like NiCr or NiMo, and stainless steel. In some embodiments the metal of CE can be the same as the deposited one; in such case, the amount of the metal on CE should suffice for the required electrodeposition duration. The thickness of the CEs can vary from tens of nanometers to a few millimeters, but in some embodiments it may be greater. The height of NCM barriers is not less than the thickness of CEs; preferably it is at least 1.5-10 times higher to minimize the influence of the neighboring electrodes on the local metal deposition. The potential applied on SWE is negative with respect to CE, if the metals are to be deposited on SWE. The number, shapes, and arrangement of CEs are modified in accordance with the intended application. The current/potential can be switched on and off between any individual ME and the SWE, thus effecting metal deposition only in the specific region lying directly opposite to the considered CE.

The general electrochemical reaction of electrodepositing metal (cathodic reaction) is:

$$M^{x+} + xe^- \rightarrow M^0 \qquad \text{(Equation 1)}$$

where M is a metal that being deposited on SWE, and x is the charge size of the metal cation. The reverse reaction happens under electrodissolution of SWE.

The corresponding electrochemical (anodic) reaction on CE is water decomposition generating oxygen:

$$2H_2O \rightarrow 4H^+ + 4e^- + O_2 \qquad \text{(Equation 2)}$$

for acidic and neutral solutions, and:

$$4OH^- \rightarrow 2H_2O + 4e^- + O_2 \qquad \text{(Equation 3)}$$

for alkaline solutions.

Metals and alloys that can be deposited from aqueous solutions may comprise Zn, Ni, Co, Fe, Pb, Cr, Cu, Sn, Cd, Bi, Sb, Mn, Ag, and noble metals like Pt, Ir, Au, or others. Additional metals can be doped with the deposited metals, such as W, Mo, V, Ga, In, and others. When non aqueous electrolytes used e.g. ionic liquid, other metals and alloys can be deposited such as Mg, Al, Ti, Ge, and others, that cannot be deposited effectively from aqueous electrolytes. Aqueous electrolytes usually contain metal salts when the salt anion may comprise chloride, sulfate, phosphates, pyrophosphate, sulfamate, cyanide, nitrate, carboxylates, and other organic and inorganic ions. Various additives and complexing agents can be used, such as EDTA, citrates, and others. The pH of the aqueous electrolytes are regulated by adding buffers, comprising organic or inorganic components; the employed acids may include sulfuric, hydrochloric, nitric, boric, and others.

Figure 2:
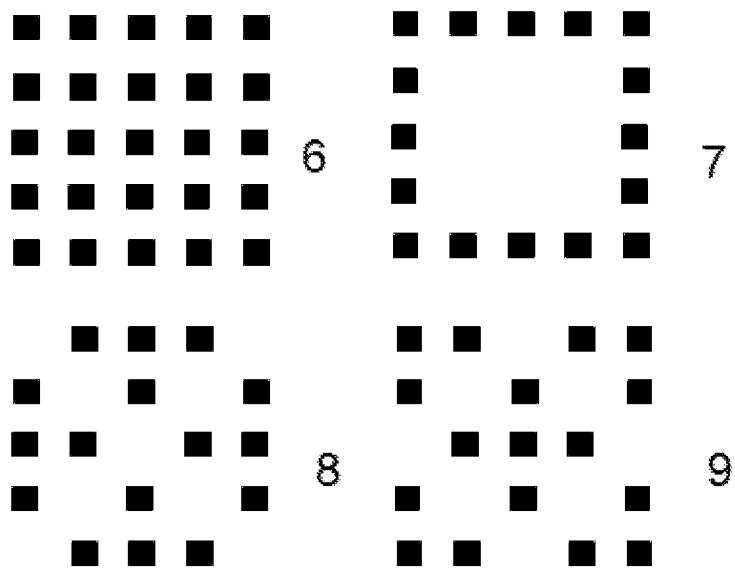
FIG. 2. shows an example of a deposition pattern created by a method according to one embodiment of the invention.

The switching on and off of the individual CEs in the array of counter electrodes can generate different patterns of metal deposits on SWE, for example as shown in FIG. 2. For example, when all CEs arranged in a rectangular network are switched on, a filled-square pattern can be formed (6); when only outer CEs are switched on, a square circumference can be formed (7); however, any other pattern can be generated, such as seen in (8) or (9), when the CEs lying directly opposite to the black squares are switched on and all other CEs are switched off. In fact, any possible pattern can be generated from said 5×5 electrodes in FIG. 2 by switching the corresponding CEs on or off. In general, CE shapes and configurations can be adjusted as desired, and the number of their combinations is practically limitless. In some embodiments the voltage and current through each individual CE is controlled independently.

Figure 3:
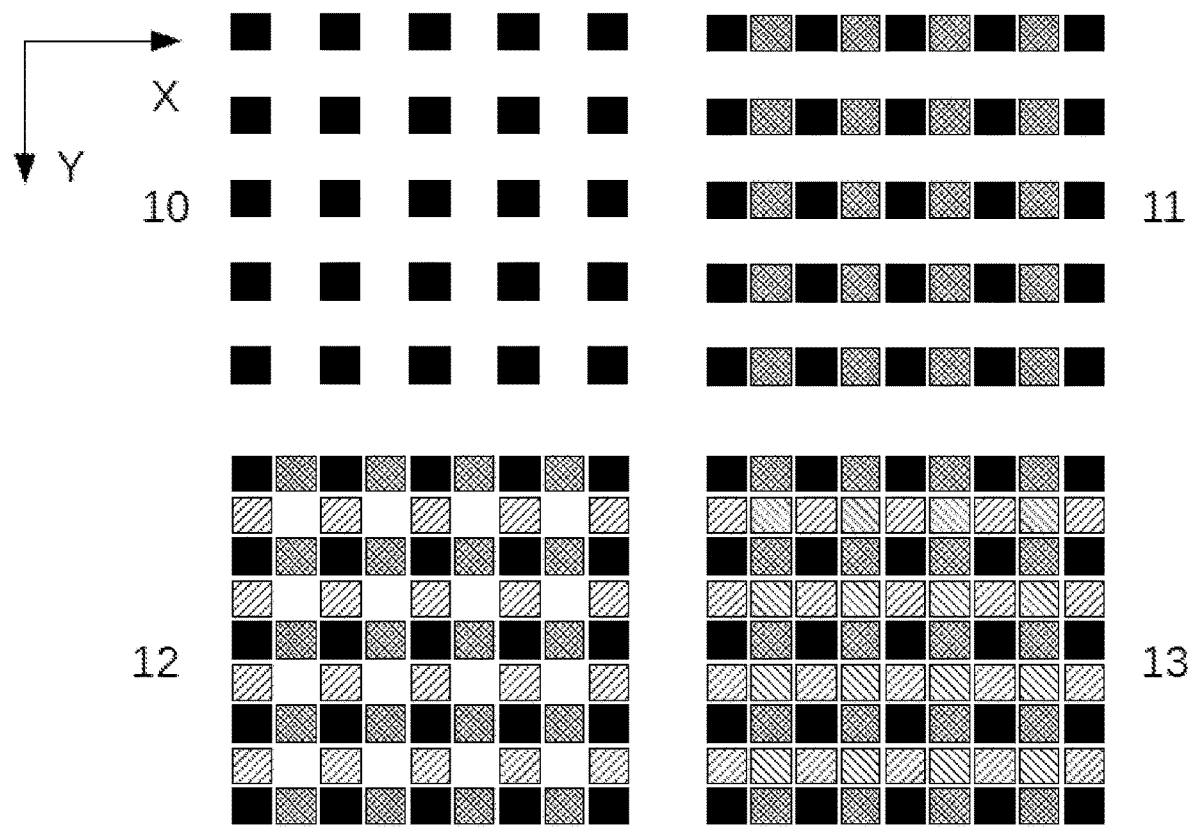
FIG. 3. is a schematic representation of step-by-step deposition by a method according to one embodiment of the invention, the deposition filling the whole area covered by an electrode array of a device according to the invention.

The CE or SWE or both can be moved latterly in order to deposit metal in areas between the CEs. FIG. 3 shows such a gradual deposition over the whole area, while possibly continually shifting the deposition location. For example, firstly all CEs in the followed area are switched on, and the metal deposition occurs on SWE in the regions directly opposite to the CEs (10). In the next step, the relative position of SWE and CEs is changed, for example by moving the SWE right along X-axis by the distance equal to the CE length with the right outer column of CEs being switched off, whereby generating a new deposition pattern (11). In the next step, the SWE is moving back left along X and then moving down along Y-axis with bottom outer line of CEs being switched off to generate the pattern (12). Finally the SWE is moved right along X again, while switching off the right column and the bottom line of CEs, to generate a final pattern (13). By moving the SWE and CEs along the Z-axis, a 3D structure is created.

Using these step-by-step depositions associated with predetermined mutual movements of the CEs and SWE along the X-axis, Y-axis, and Z-axis, a desired 3D pattern can be obtained. For example, it is possible to fabricate 3D metal structures designed by means of a CAD software. In one embodiment, 3D structure may be discretized along Z direction, depending on the required resolution and precision, and in accordance with the resolution and precision of the motor responsible for the movement along Z axis. A 3D structure may be reduced to a group of ordered 2D cross-sections, whereas each cross-section may be discretized according to the given resolution and the size and shape of the CEs. In one embodiment, each volume element of the 3D structure may be transformed into a 3D set of zeros and ones where zero and one correspond to CE being switched off and or, respectively. In a method according to the invention, a plurality of different metals can be employed; deposition of different metals on top of each other is known. For example, an initial Cu structure can be printed from the electrolytes containing copper cations, followed by printing a Ni structure on top of the first Cu structure after introducing a nickel cation electrolyte instead of the copper one.

Figure 4:
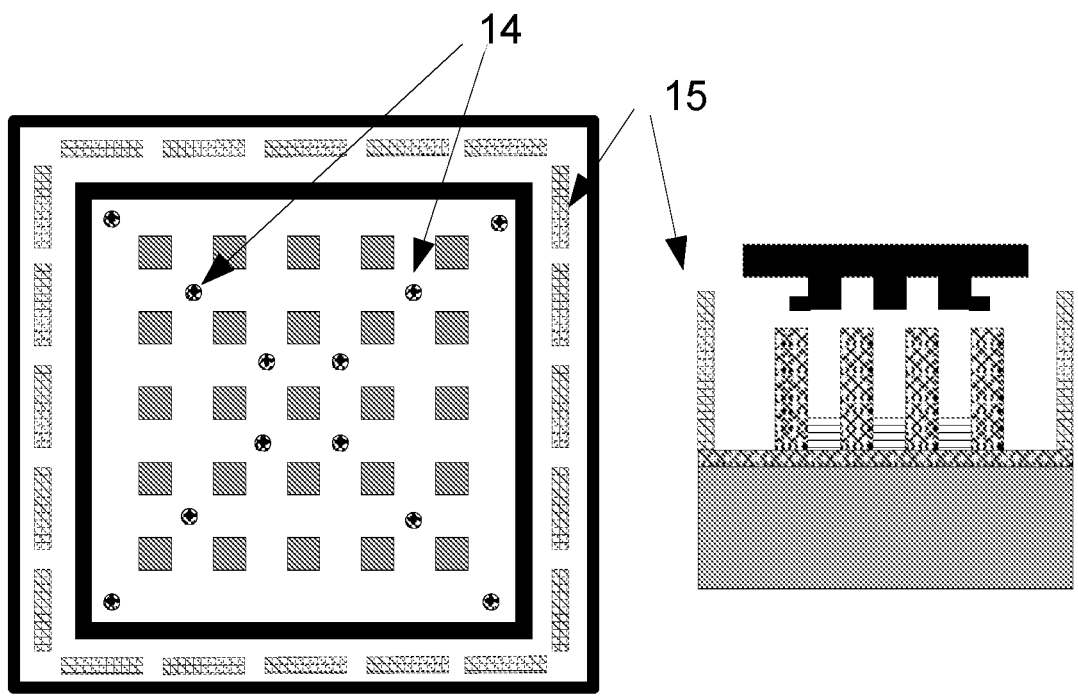
FIG. 4. shows circumventing arrangement of outer counter electrodes for horizontal electroplating and placement of microelectrodes in a method according to one embodiment of the invention.

As shown in FIG. 4, an electrochemical device according to the invention may be equipped with an array of electrolyte conductivity measurement electrodes 14 (ECME) and outer counter electrodes 15 (CE). The ECME can be distributed across the area comprising CE at different locations and used for measuring electrolyte conductivity. Each ECME may comprise two or four electronically conductive substrates made of or covered with corrosion-resistant material such as gold, Pt, Ti, or others. They can have different shapes, such as pins, plates, semi-spheres, etc. The current or voltage is applied, and the voltage or current is measured. Based on these values, the conductivity of the electrolyte is measured at different locations across the CE area. The measurement of electrolyte conductivity is carried out regularly to account for changing electrolyte concentration and adjust a value of potential or current applied between individual electrodes of ACE and SWE during the electroplating process. In order to facilitate a deposition/dissolution in the direction perpendicular to the conventional direction between SWE and CEs, the outer CEs (15) are introduced as shown in FIG. 4. When the current or voltage is applied between SWE and some selected outer CEs, a metal deposition on SWE deposited structures will be initiated. By using such approach it is possible to create overhanging microstructures or modify the electrodeposited parts to increase the surface area (FIG. 4).

Figure 5:
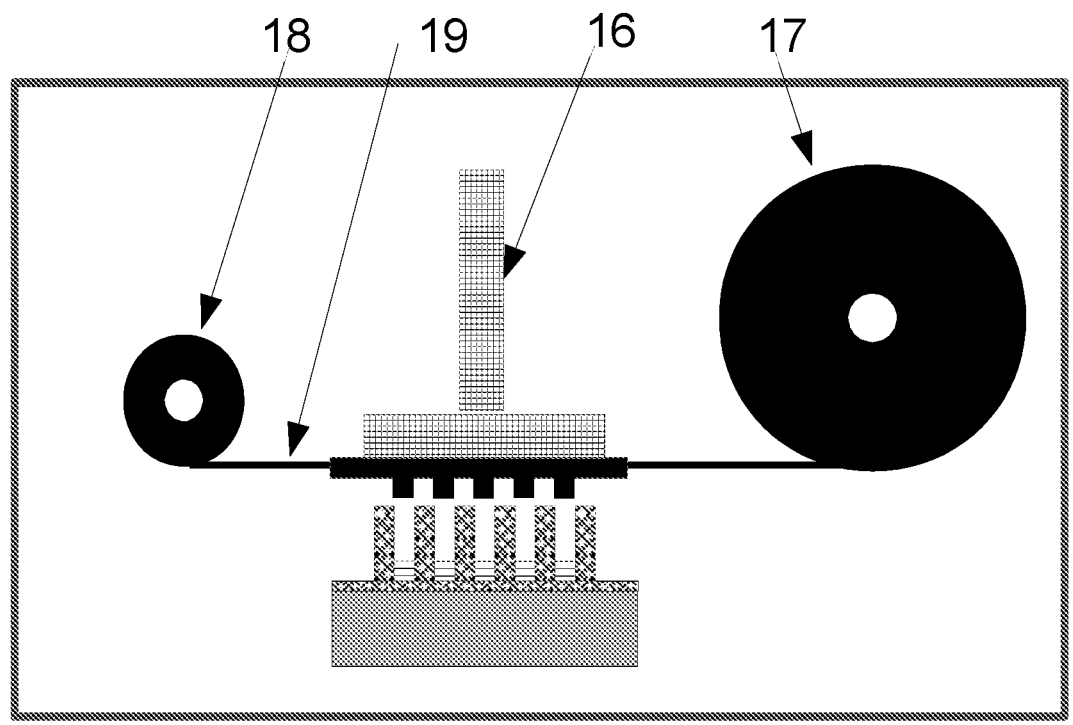
FIG. 5. schematically shows a device for continuous electroplating of 3D microstructures according to one embodiment of the invention.

FIG. 5 shows one aspect of continuously electroplating in a device according to the invention. Head (16) temporarily determines the area where the electroplating takes place. The material or substrate for making the SWE in this case is a conductive sheet rolled in a feeding roller 17 that is unwinding after accomplishing the desired electroplating step. A receiving roller (18) accepts sheet (19) after each step of electroplating on SWE is finished. In some embodiments, some or all rollers can be replaced with stacked sheet pieces or other substrate forms or substrate holders, allowing continuous feeding of the conductive substrates.

While the invention has been described using some specific examples, many modifications and variations are possible. It is therefore understood that the invention is not intended to be limited in any way, other than by the scope of the appended claims.

The invention claimed is:

1. A device for manufacturing a 3D metal structure by electrochemical deposition (ECD), comprising
  i) a continuous cathode comprising a plurality of planar surfaces;
  ii) a container configured to hold an electrolyte that is configured to be in contact with one planar surface of said plurality of planar surfaces during one stage of electrochemical deposition, the electrolyte comprising ions of said metal;
  iii) an array of separate anodes, configured to be in contact with said electrolyte and arranged on a planar non-conductive plate (NCP) in a planar 2D grid, the plane of said plate being parallel to and opposite said one planar surface of the continuous cathode, wherein the separate anodes are configured to deposit said metal onto said one planar surface in a deposition area opposite thereto, when an electric current and/or potential is applied between said separate anodes and said continuous cathode, wherein said array of separate anodes is embedded in said NCP, so that the NCP isolates the separate anodes from each other by non-conductive barriers, and wherein the height of said non-conductive barriers is 1.5-10 times greater than the height of said separate anodes;
  iv) a feeding roller configured to unwind the cathode and a receiving roller configured to wind the continuous cathode comprising said deposited metal following said one stage;
  v) a controlling system configured to individually regulate the current and/or potential between said continuous cathode and said separate anodes, the controlling system comprising a microprocessor for storing predetermined parameters and for collecting data; and
  vi) electrically conductive connectors connecting said separate anodes with said controlling system, the connectors being electrically insulated from said electrolyte, wherein said predetermined parameters comprise at least one combination of separate anodes selected from said array to represent an anode pattern template in said 2D grid, which anode pattern template provides a deposition pattern on said one planar surface during a discrete time period, when said current and/or potential is applied to said at least one combination of separate anodes, said deposition pattern being a cross-section of one or more layers of said 3D metal structure that is deposited in said one stage.

2. The device of claim 1, further comprising an altering means for changing the deposition pattern in two consecutive discrete time periods, wherein said altering means is selected from the group consisting of a means for laterally changing a relative position of said one planar surface and said NCP, and a means for changing said at least one combination of separate anodes.

3. The device of claim 2, wherein said means for laterally changing the position of said one planar surface and/or said NCP comprise a micro-controlled engine or motor.

4. The device of claim 1, wherein said predetermined parameters comprise a sequence of deposition patterns to be applied in a sequence of consecutive time periods, resulting in a sequence of thin layers composing said 3D metal structure that is deposited in said one stage.

5. The device of claim 2, wherein said altering means is configured to consecutively switch on a predetermined sequence of combinations of separate anodes.

6. The device of claim 1, wherein said grid is a rectangular grid, said separate anodes have a square cross-section, and the surface of the anode array covers at least about 20% of the NCP plane.

7. The device of claim 1, further comprising a shifting means for adjusting a distance between said one planar surface and said NCP, the means comprising a micro-controlled engine.

8. The device of claim 1, wherein said controlling system is configured to reverse the current and/or potential between said separate anodes and said continuous cathode to dissolve a part of the metal deposited on said one planar surface.

9. The device of claim 1, comprising a fixing head which holds said one planar surface in the position opposite said array of separate anodes during said one stage.

10. The device of claim 9, wherein the feeding roller is configured to feed said one planar surface to the position opposite said array of separate anodes for said one stage and/or wherein said fixing head is configured to enable the translation of the continuous cathode by a desired distance after said one stage, and hold a consecutive portion of the continuous cathode for a consecutive stage, thereby forming a plurality of 3D metal structures on said continuous cathode.

11. The device of claim 1, wherein said NCP comprises a material selected from the group consisting of polymer, glass, and ceramic.

12. The device of claim 1, wherein at least a part of the separate anodes are configured to deposit said metal along the direction perpendicular to said one planar surface.

13. The device of claim 1, further comprising electrodes for measuring conductivity of said electrolyte.

14. A method for manufacturing a 3D metal structure by electrochemical deposition (ECD), comprising
i) providing a continuous cathode being wound on a feeding roller, the continuous cathode comprising a plurality of planar surfaces, a container configured to hold an electrolyte that is configured to be in contact with one planar surface of said plurality of planar surfaces during one stage of electrochemical deposition, the electrolyte comprising ions of said metal, an array of separate anodes arranged on a planar non-conductive plate (NCP) in a planar 2D grid, the plane of said plate being parallel to and opposite said one planar surface of the cathode, wherein said array of separate anodes is embedded in said NCP, so that the NCP isolates the separate anodes from each other by non-conductive barriers, and wherein the height of said non-conductive barriers is 1.5-10 times greater than the height of said separate anodes, and a receiving roller configured to wind the continuous cathode following said one stage; and connecting the separate anodes with a controlling system which individually regulates a current and/or potential between the separate anodes and said continuous cathode, and which comprises a microprocessor or a memory for storing software and data;
ii) supplying to said microprocessor data defining said 3D structure to be manufactured, and creating by a software in said microprocessor a plurality of 2D cross-sections essentially composing said 3D structure; and
iii) selecting at least one combination of separate anodes for each 2D cross-section to create an anode pattern template in said 2D grid, which enables deposition of said metal in a deposition pattern essentially forming an image of said 2D cross-section on said one planar surface when said current and/or potential is applied to said at least one combination of separate anodes; and applying said current and/or potential for a time period sufficient to form a layer of a predetermined thickness;
iv) repeating the previous step, thereby creating one layer after another, eventually forming said 3D structure on said one planar surface; and
v) winding the continuous cathode comprising said deposited metal on the receiving roller.

15. The method of claim 14, wherein said step iv comprises changing the deposition pattern in consecutive discrete time periods by laterally changing a position of said one planar surface and said NCP by using a micro-controlled engine and/or changing said combination of separate anodes.

16. The method of claim 14, being a continuous process for manufacturing a plurality of 3D metal structures, wherein each surface serves for manufacturing one 3D metal structure in said one stage, the planar surface being held opposite the array of separate anodes by a fixing head during said one stage.

17. The method of claim 16, comprising moving said continuous cathode along the array of separate anodes, wherein said feeding roller feeds said one planar surface to the position opposite said array of separate anodes for said one stage, and/or wherein said fixing head enables movement of the continuous cathode by a desired distance after said one stage, and holds a consecutive portion of the continuous cathode for a consecutive stage, thereby forming a plurality of 3D metal structures on said continuous cathode.

18. A device for manufacturing a 3D metal structure by electrochemical deposition (ECD), comprising
i) a continuous cathode comprising a plurality of planar surfaces;
ii) a container configured to hold an electrolyte that is configured to be in contact with one planar surface of said plurality of planar surfaces during one stage of electrochemical deposition, the electrolyte comprising ions of said metal;
iii) an array of separate anodes, configured to be in contact with said electrolyte and arranged on a planar non-conductive plate (NCP) in a planar 2D grid and embedded therein, the plane of said plate being parallel to and opposite said one planar surface of the continuous cathode, wherein the separate anodes are configured to deposit said metal onto said one planar surface in a deposition area opposite thereto, when an electric current and/or potential is applied between said separate anodes and said continuous cathode, wherein the NCP isolates the separate anodes from each other by non-conductive barriers, and wherein the height of said non-conductive barriers is about 1.5-10 times greater than the height of said separate anodes so as to minimize an influence of neighboring separate anodes on said metal deposition in the deposition area opposite each separate anode;
iv) a feeding roller configured to unwind the cathode and a receiving roller configured to wind the continuous cathode following said one stage;
v) a controlling system configured to individually regulate the current and/or potential between said continuous cathode and said separate anodes, the controlling system comprising a microprocessor for storing predetermined parameters and for collecting data; and
vi) electrically conductive connectors connecting said separate anodes with said controlling system, the connectors being electrically insulated from said electrolyte, wherein said predetermined parameters comprise at least one combination of separate anodes selected from said array to represent an anode pattern template in said 2D grid, which anode pattern template provides a deposition pattern on said one planar surface during a discrete time period, when said current and/or potential is applied to said at least one combination of separate anodes, said deposition pattern being a cross-section of one or more layers of said 3D metal structure that is deposited in said one stage.

* * * * *